Jan. 16, 1951          J. R. LIKENS          2,538,531
VEHICLE FOR TRANSPORTING REMOVABLE CARGO CONTAINERS
Filed June 2, 1947          2 Sheets-Sheet 1
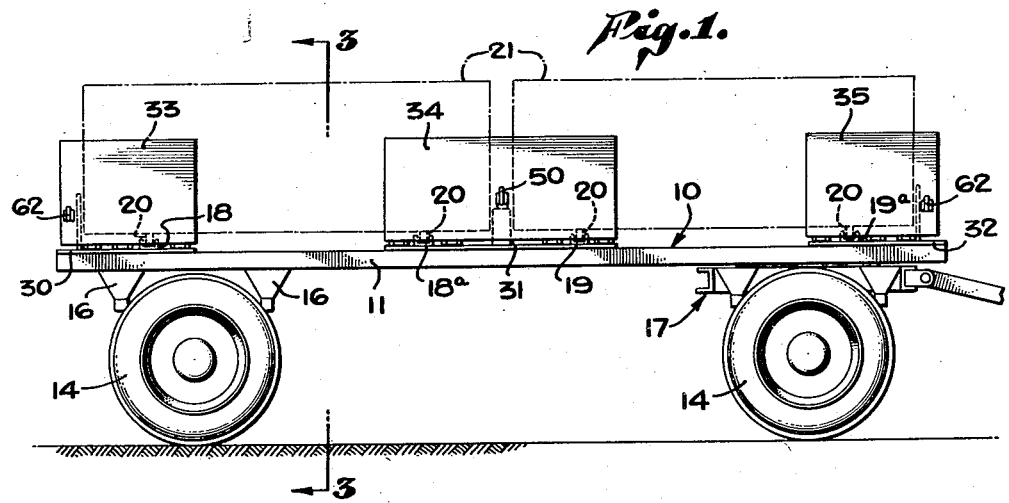
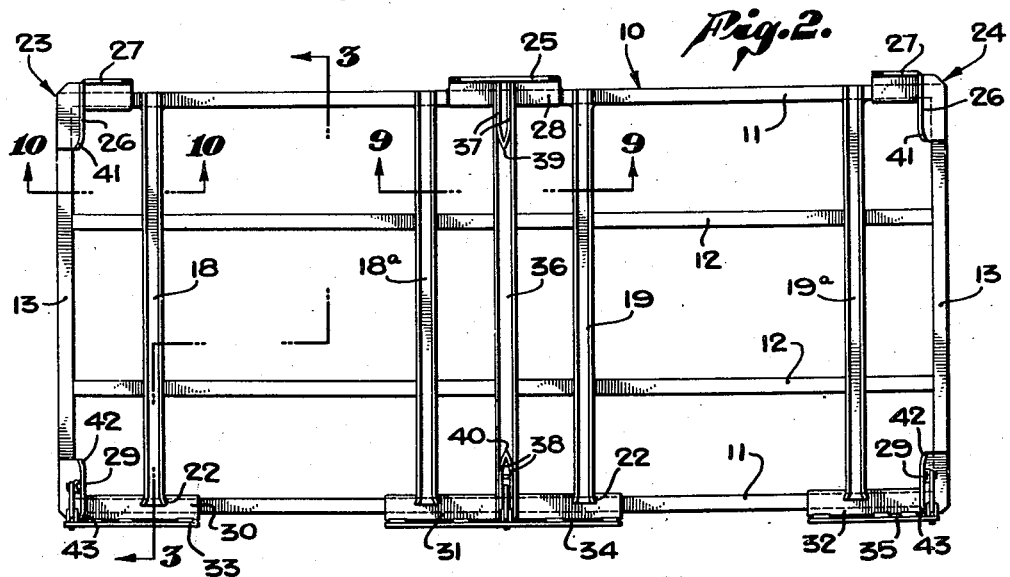
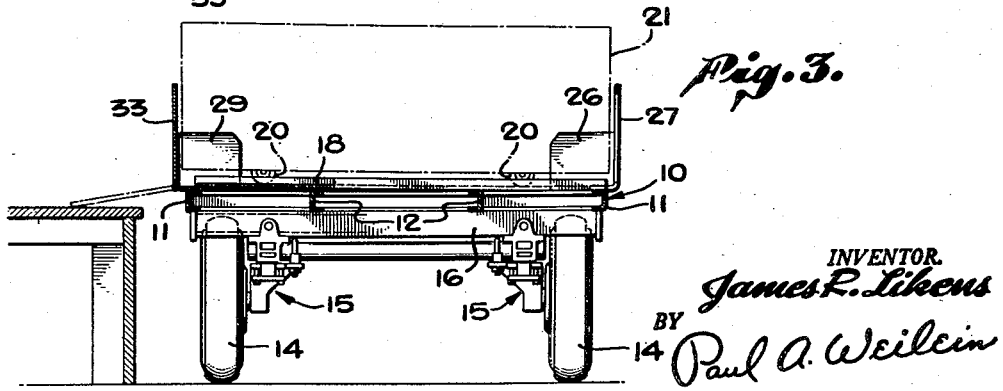
INVENTOR.
James R. Likens
BY Paul A. Weilein
ATTORNEY

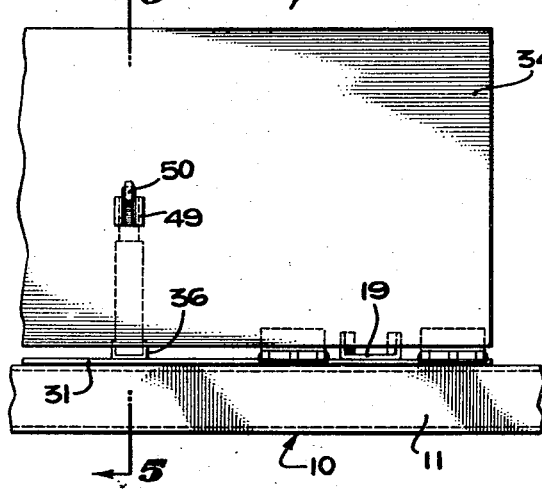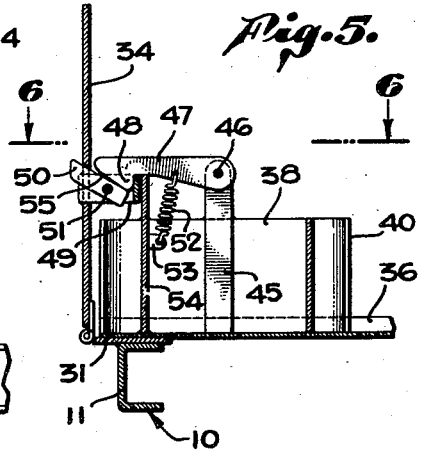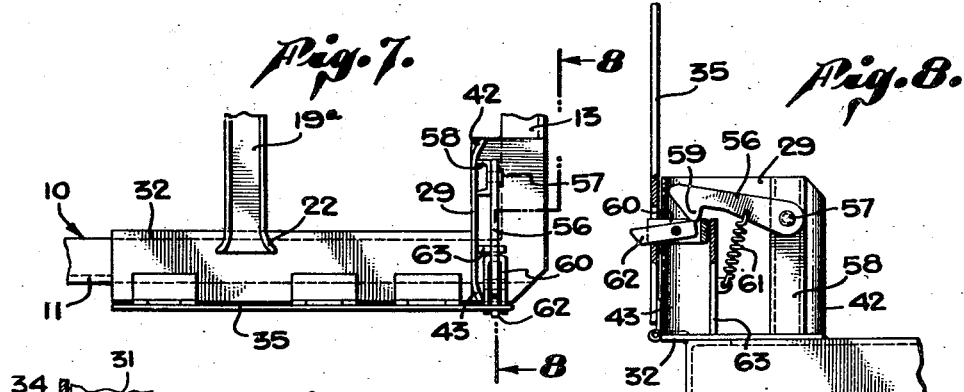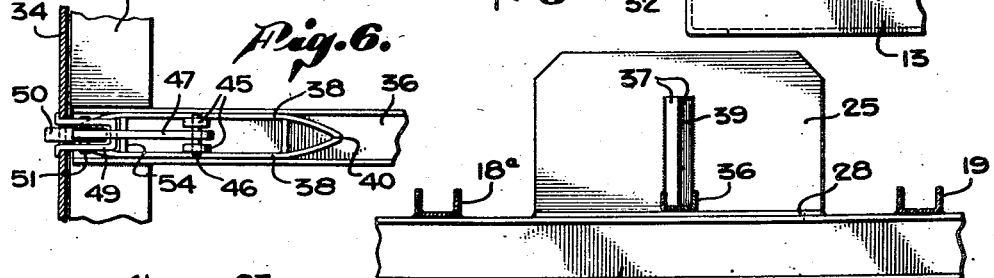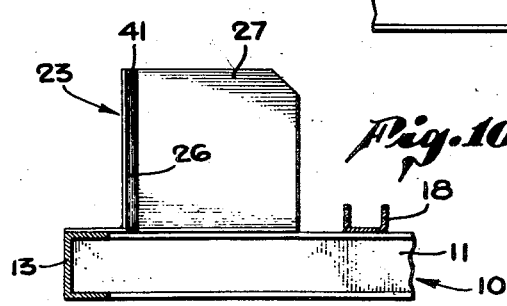

Patented Jan. 16, 1951

2,538,531

UNITED STATES PATENT OFFICE 2,538,531

VEHICLE FOR TRANSPORTING REMOVABLE CARGO CONTAINERS

James R. Likens, Los Angeles, Calif.

Application June 2, 1947, Serial No. 751,726

3 Claims. (Cl. 296—35)

This invention relates generally to wheeled vehicles and particularly to trailers especially adapted for use in harvesting and transporting produce.

In the harvesting of produce crops on a large scale it is customary to haul trailers through the produce field, in which the produce is deposited by the harvesting crew as it is harvested. When a trailer is loaded, it is hauled to a warehouse or other central point for cleaning, sorting and crating of the produce. For produce which is not easily damaged by bulk handling, a trailer having an open box body is usually employed, the produce being generally unloaded by tilting the body to discharge the produce through an open side of the body.

Certain types of produce, such as lettuce for example, are too easily damaged by such bulk handling, and hence it is deemed preferable to load such produce in containers which may be removed from the trailer. The present invention is directed to improvements in trailer equipment of the latter type especially designed for improved handling of tender varieties of produce such as lettuce and the like.

It is a general object of this invention to provide improved equipment for transporting and handling bulk material such as produce in containers which may be removed from the transport vehicle.

It is another object of this invention to provide an improved trailer facilitating the disposal thereon and the removal therefrom of portable containers for produce and the like.

It is another object of this invention to provide a trailer having novel and improved means for slidably supporting and guiding a portable container into a predetermined position thereon, and for snugly supporting it in such position.

It is a further object of this invention to provide a trailer provided with guide rails serving as tracks for the wheels of a wheel-mounted portable container.

It is a still further object of this invention to provide a trailer particularly adapted for use with portable containers, wherein the containers are secured on the trailer by pivoted walls which, when lowered, serve as ramps for the loading and unloading of the containers.

It is a still further object of this invention to provide a trailer having novel and improved means for releasably securing removable containers thereon.

It is a still further object of this invention to provide a trailer of the foregoing type which is of rugged, sturdy and yet light-weight construction and which is particularly well adapted to the specialized use for which it is designed.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

A trailer constructed in accordance with this invention comprises in general a skeleton framework of rectangular shape to which the wheels are attached by suitable mounting means. Extending transversely of the frame are two or more pairs of trackways, the trackways of each pair being spaced apart longitudinally of the frame a suitable distance to accommodate the wheels of a wheel-mounted container for the produce or other material to be transported. Such a container is commonly referred to as a basket. Thus, each basket is laterally supported on the trailer only at its corners, in order to minimize the weight of the trailer. For this purpose, the corners of the trailer frame are provided with upright plates extending a short distance longitudinally and transversely of the frame and of a height materially less than that of the baskets. Longitudinal upright plates on the sides of the frame intermediate its ends overlap adjacent corners of the baskets, and transverse supporting and guiding plates extend inwardly from the intermediate plates between the baskets. The transverse plates are suitably spaced to snugly embrace the baskets and support them against movement on the trailer during transport, and their leading edges are rounded or beveled to facilitate entrance of the baskets therebetween.

In order to permit loading and unloading of the baskets from one side of the trailer, the upright plates along one side are pivoted to the frame at their lower edges so that they may be swung outwardly and downwardly. These pivoted plates overlap the respective trackways, so that they serve as ramps over which the basket wheels roll during loading and unloading.

Each of the pivoted plates is adapted to be releasably latched in its upright position to secure the baskets on the trailer, the latch means being so disposed as not to interfere with the movement of the baskets.

Referring to the drawings:

Figure 1 is a view in side elevation of a trailer embodying the invention, with baskets mounted thereon as indicated by broken lines;

Figure 2 is a top plan view of the trailer frame;

Figure 3 is a transverse sectional view taken on line 3—3 of Figures 1 and 2;

Figure 4 is an enlarged fragmentary view in side elevation of the central pivoted plate or door;

Figure 5 is a fragmentary sectional view taken on line 5—5 of Figure 4 and illustrating details of the latch mechanism in latching position;

Figure 6 is a top plan view of the latch mechanism, taken on line 6—6 of Figure 5;

Figure 7 is an enlarged fragmentary view of the lower, right-hand corner of the frame shown in Figure 2;

Figure 8 is a fragmentary transverse sectional view taken on line 8—8 of Figure 7, showing the latch mechanism in released position;

Figure 9 is a fragmentary sectional view taken on line 9—9 of Figure 2; and

Figure 10 is a fragmentary sectional view taken on line 10—10 of Figure 2.

Referring particularly to Figures 1 to 3 of the drawings, the trailer frame, generally designated 10, consists of a skeleton framework comprising longitudinal side frame members 11, intermediate longitudinal frame members 12, and end frame members 13. The frame 10 may be mounted on the wheels 14 in any convenient manner. In the present instance the rear wheels are mounted on wheel mounting assemblies 15 (Figure 3) which are detachably secured to a pair of transverse sub-frame members 16 secured to the underside of the frame, as described and claimed in my copending application, Serial Number 723,434, filed January 21, 1947, now abandoned. The front wheels may be similarly mounted on a fifth wheel assembly 17 pivotally connected to the frame in a conventional manner.

Extending transversely of the frame 10 and welded or otherwise rigidly secured to the upper surfaces of the frame members 11 are two pairs of parallel track members 18, 18a and 19, 19a. Each track member is U-shaped in cross section, as shown most clearly in Figures 9 and 10, and may be formed from commercial channel mill stock. The track members of each pair are spaced apart a distance conforming to the spacing of the wheels 20 of baskets 21 (Figures 1 and 3), and serve as trackways for the wheels. The baskets are loaded onto the frame and unloaded therefrom at the lower side, as viewed in Figure 2, and in order to assist in the initial engagement of the wheels 20 with the trackways during loading, the end of each trackway is flared outwardly at 22.

Means are provided on the frame 10 for engagement with each corner of the baskets to firmly retain them in position on the frame. At the side of the frame opposite the loading side, rigid supporting members in the form of corner plates 23 and 24 and a centrally disposed side plate 25 are rigidly attached, as by welding, to the frame. The corner plates 23 and 24 each comprise an upright end plate 26 and a side plate 27, each having a base flange welded to the frame 10. The side plate 25 also has a base flange 28 welded to the frame member 11.

At the loading side of the frame the baskets are supported against movement longitudinally of the frame by rigid upright end plates 29 having base flanges secured to the end frame members 13. Secured to the adjacent side frame member 11 are three base plates 30, 31 and 32, it being noted that the loading ends of the respective track members 18, 18a, 19 and 19a overlie these base plates. Gate members 33, 34 and 35 are hinged at their lower edges to the outer edges of the respective base plates, to permit their being swung outwardly and downwardly as indicated in Figure 3. In their lowered positions, the gate members serve as ramps for the basket wheels during loading and unloading of the baskets, and when latched in their upright positions as described hereinafter, they support the baskets against lateral movement.

Referring to Figure 2, it will be observed that a central tie member 36 extends transversely of the frame 10, the ends thereof overlying the central base plates 28 and 31 and being welded thereto. The tie member 36 is preferably channel-shaped, as shown in Figures 4 and 9. Disposed within the channel at opposite ends of the tie member are pairs of upright guide plates 37, 37 and 38, 38, the inner portions of each pair of plates converging to a single edge at 39 and 40, respectively. It will also be observed by reference to Figure 2 that the inner upright edges of the corner plates 26 and of the end plates 29 are rounded outwardly at 41 and 42, respectively, as are also the outer edges of the end plates 29 at 43. Each basket is adapted to have snug engagement at its corners with plates 26, 29, 37 and 38, and the outward flaring of the edges of the plates serves to guide the baskets into position between the plates.

Each of the gate members 33, 34 and 35 is adapted to be releasably latched in its upright position. In Figures 5 and 6 the latch mechanism for the central gate member 34 is shown in side elevation and in top plan view, respectively. A pair of upright plates 45 are welded to the inner faces of the guide plates 38 and extend upwardly thereabove. A transverse pivot pin 46 extends between the plates 45 and pivotally supports a latch member 47 at its inner end. The outer, free end of the latch member is provided with a latch lug 48 which is adapted to have interlocking engagement with a U-shaped bracket 49 mounted in an opening in the gate member 34 and projecting inwardly therefrom. A latch trip member 50 is pivotally mounted on the bracket 49 on a transverse pivot pin 51, the inner end of the trip member extending beneath the latch lug 48 and the outer end thereof projecting outwardly through the opening in the gate member. The latch member 47 is yieldingly urged downwardly by a spring 52 connected at one end to the latch member and at its other end to a bracket 53 on an upright plate 54. The plate 54 serves as an abutment engageable by the bracket 49 when the gate member assumes an upright position, and the upper edge of the plate limits the downward movement of the latch member when the gate member 34 is in open position. It will be observed that an inclined cam surface 55 is formed on the latch and is engaged by the bracket 49 to raise the latch as the gate member is swung into upright position, thus providing automatic latching of the gate member. To release the latch, the outer end of the trip member is moved downwardly, causing the inner end thereof to raise the latch until it clears the upper edge of the bracket 49, whereupon the gate member is free to swing outwardly. This releasing operation is illustrated in Figure 8 in connection with the latch for the end gate member 35.

The latch mechanisms for the end gate members 33 and 35 are identical and are in all essential respects similar to that just described in connection with the central gate member 34. Referring to Figures 7 and 8, it will be observed that the latch 56 is pivotally mounted by a pivot pin 57 on an upright channel member 58 welded to the outer face of the end plate 29. A latch lug 59 on the free end of the latch is adapted to engage a bracket 60 mounted in an opening in the gate member 35, and is yieldably retained in latching engagement therewith by a spring 61. A trip member 62 is mounted within the bracket 60 and functions in the same manner as the trip member 50 of Figure 5. An abutment plate 63 limits the inward movement of the gate member and also limits the downward movement of the latch member.

It will be particularly noted that the latch mechanism for the central gate member 34 is disposed entirely between the guide plates 38, and that the latch mechanisms for the end gate members 33 and 35 are disposed on the outer sides of the end plates 29. In this manner the possibility of interference by the latch mechanisms with the movements of the baskets onto or off the trailer, or of damage to the latch mechanisms by the baskets, is entirely avoided. It will also be observed that the latches may be tripped from the outer sides of the gate members, and that this is effected by means which project laterally outwardly only a slight distance beyond the gate members. In this manner the maximum overall width permitted by highway regulations may be substantially entirely devoted to the cargo space between the side plates and the gate members, with a minimum of waste space.

It will be apparent from the foregoing description and the accompanying drawings that a trailer constructed in accordance therewith embodies only those elements which are essential to a sturdy construction, adequate support and bracing of the baskets, and ease of loading and unloading of the baskets. By the elimination of non-essential features such, for example, as continuous side and end walls and flooring, the weight and the cost of construction are both reduced to a minimum.

An important feature of this construction is the provision for snug engagement of the sides of the baskets by the upright plates 26, 29, 37 and 38. Longitudinally acting inertia forces resulting from acceleration and deceleration of the trailer, and tending to cause swaying of the baskets transversely of the wheel trackways, are absorbed by these plates rather than by transverse thrust of the basket wheels against the sides of the trackways. The wheel brackets and bearings are thus relieved of the severe strains which would otherwise be imposed thereon during transportation.

Although in the illustrated embodiment the hinged gate members are provided on only one side of the trailer, it will be evident that, if desired, they may be provided at both sides to permit loading and unloading of the baskets from either side. Various other modifications may obviously be made without departing from the spirit of the invention or the scope of the appended claims.

I claim:

1. A vehicle comprising a base frame, upright members on said base frame defining a plurality of compartments thereon, gate members pivoted to said frame and extending at least partially across one side of each of said compartments, and latch means for releasably latching said gate members in closed position, each latch means comprising a latching surface on a respective gate member, a latch member pivotally mounted on an adjacent upright member for movement into and out of engagement with said latching surface, and a latch releasing member movably mounted on said gate member and engageable with said latch member for moving the latter to released position, said latch releasing member being operable from the outer side of the gate member.

2. In a vehicle, a base frame, rigid upright members and a pivoted gate member on said frame defining a compartment thereon, latch means for releasably latching said gate member in closed position, said latch means comprising a latch member pivotally mounted on one of said upright members outside of said compartment, bracket means on said gate member providing a latching surface engageable by said latch member, spring means yieldingly urging said latch member toward said latching position, and a latch releasing member pivotally mounted on said bracket means and engageable with said latch member to move the latter out of engagement with said latching surface, said latch releasing member having an operating portion projecting through said gate member to the outer side thereof, whereby said latch member may be released from the outer side of said gate member.

3. A vehicle for transporting removable cargo containers, comprising: longitudinally spaced, transverse upright members, each including a base portion secured directly to the frame; longitudinally extending members on opposite sides of the frame cooperating respectively with said transverse members to define container compartments on the frame, the longitudinal members along one side of the frame being movable respectively between container retaining positions and positions to allow placement and removal of a container; a pair of transversely extending back members in each compartment, secured to said frame in spaced relation with said transverse members and independently thereof; latch elements for said pivotally mounted longitudinal members respectively moveably supported on the adjacent upright member, and normally operative to maintain said members in container retaining position; and latch releasing means movably mounted on each of said pivotally mounted longitudinal members, and having a portion accessible from the outer side of said member for optional operation to release the latch element.

JAMES R. LIKENS.

REFERENCES CITED

The following references are of record in the file of this patent:

UNITED STATES PATENTS

| Number | Name | Date |
|---|---|---|
| 499,579 | Phillips | June 13, 1893 |
| 1,845,593 | Fildes | Feb. 16, 1932 |
| 1,845,594 | Fildes | Feb. 16, 1932 |
| 1,937,550 | Clarke | Dec. 5, 1933 |
| 2,288,926 | Strader | July 7, 1942 |
| 2,355,867 | Jarvis | Aug. 15, 1944 |

FOREIGN PATENTS

| Number | Country | Date |
|---|---|---|
| 261,763 | Italy | Dec. 15, 1928 |